June 1, 1971

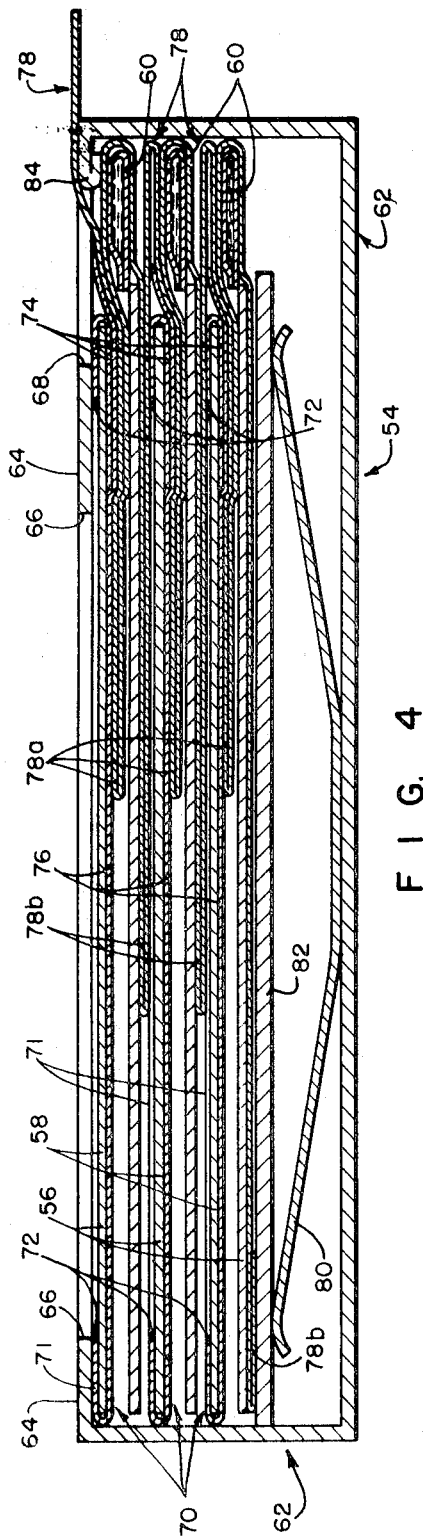
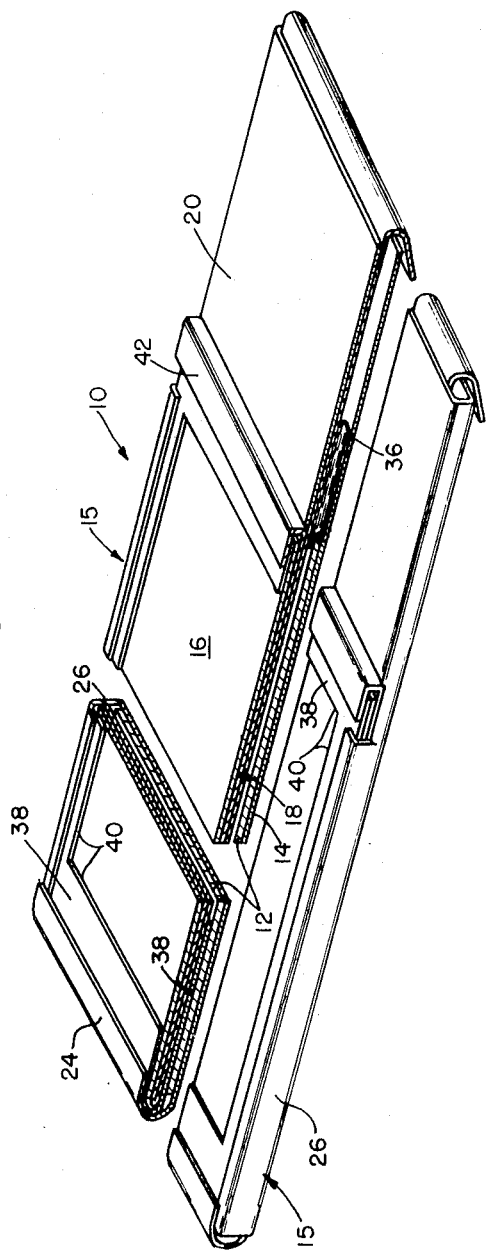

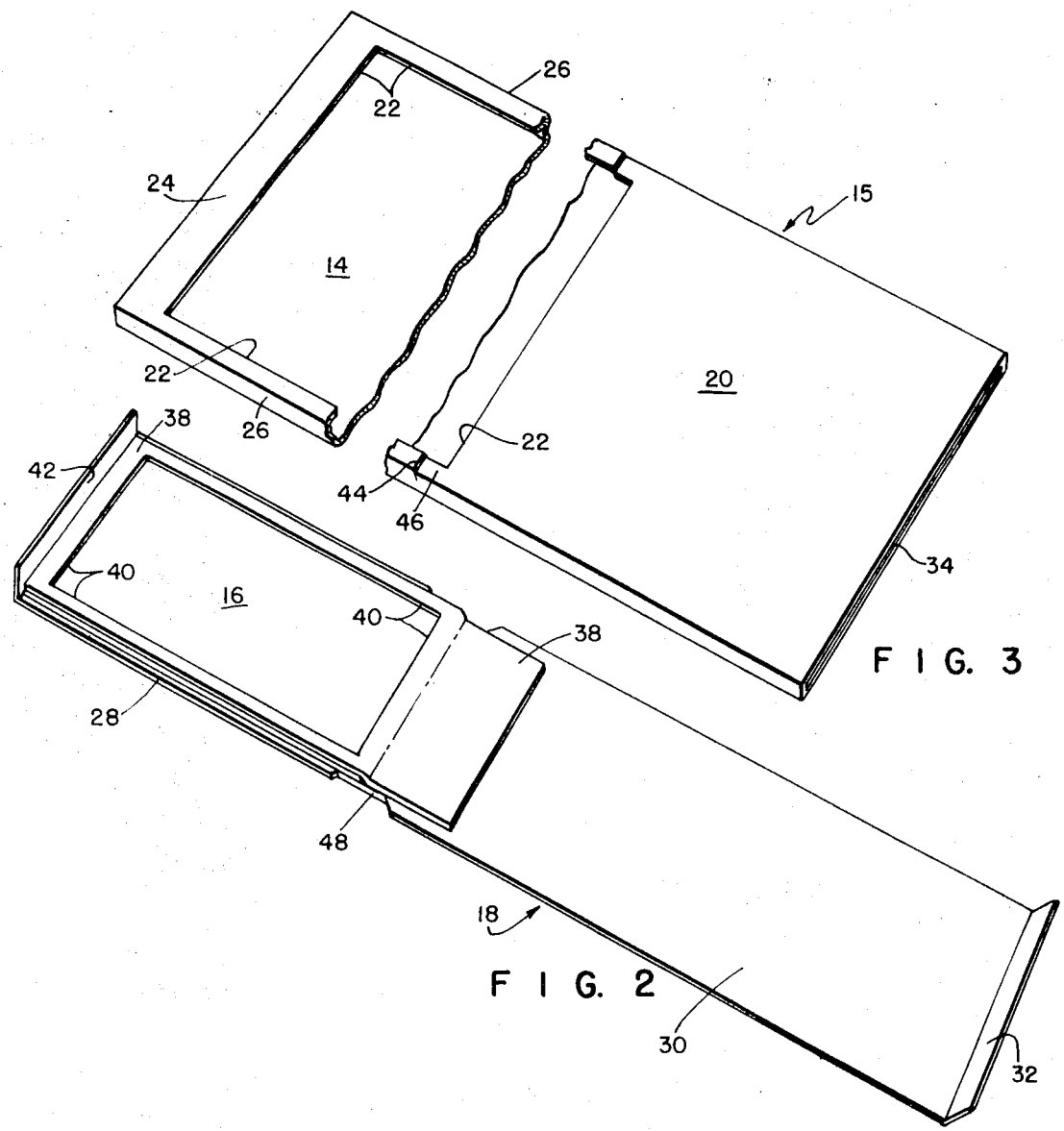

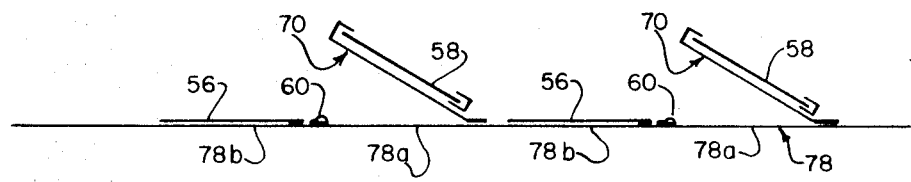
F I G. 5
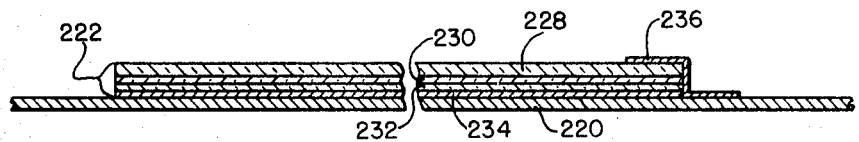
F I G. 9
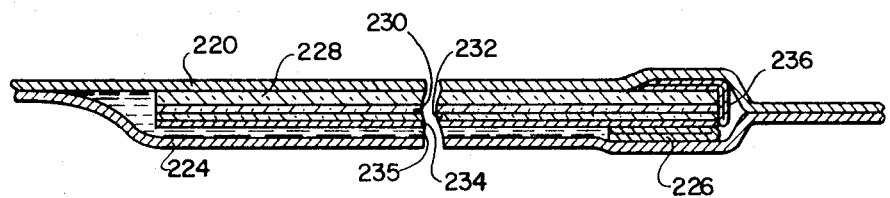
F I G. 10

I. ERLICHMAN
3,582,335
FILM UNIT HAVING SENSITIVE LAYER AND RECEIVING LAYER WITH
COMMON WEB FOR FACE TO FACE CONTACT

Original Filed Feb. 13, 1964

INVENTOR
Irving Erlichman
BY
Brown and McKulla
and
Robert E. Corb
ATTORNEYS

United States Patent Office 3,582,335
Patented June 1, 1971

3,582,335
FILM UNIT HAVING SENSITIVE LAYER AND RECEIVING LAYER WITH COMMON WEB FOR FACE TO FACE CONTACT
Irving Erlichman, Natick, Mass., assignor to Polaroid Corporation, Cambridge, Mass.
Continuation of application Ser. No. 344,601, Feb. 13, 1964, which is a division of application Ser. No. 48,666, Aug. 10, 1960, now Patent No. 3,152,529. This application Feb. 21, 1967, Ser. No. 617,725
Int. Cl. G03c 1/48, 5/54; G03b 10/10
U.S. Cl. 96—76                                    11 Claims

ABSTRACT OF THE DISCLOSURE

A photographic film assemblage adapted to be exposed and processed within a camera to produce a transfer image. The film assemblage includes a carrier sheet, a second sheet having a length less than one-half the length of the carrier sheet and an image-containing element adapted to cooperate with the second sheet during processing by a liquid composition distributed between the second sheet and image-containing element. In one embodiment, either the second sheet or the image-containing element includes a photosensitive layer adapted to be exposed to form an image and the other includes an image-receptive layer for supporting a transfer image. The image-containing element is carried by the carrier sheet and the second sheet is mounted on the carrier sheet for pivotal movement through 180° relative to the carrier sheet and image-containing element about an axis substantially in the carrier sheet. The second sheet is initially positioned with respect to the carrier sheet such that one side of the second sheet faces the carrier sheet. Both the second sheet and the image-containing element initially are symetrically positioned with respect to the pivotal axis on opposite sides thereof such that the other side of the second sheet will be located in face-to-face relation with the image-containing element upon pivotal movement of the second sheet through 180° about the axis.

---

This application is a continuation of the copending application of Irving Erlichman, Ser. No. 344,601, filed Feb. 13, 1964, now abandoned, in turn a division of application Ser. No. 48,666 filed Aug. 10, 1960 and now Pat. No. 3,152,529 dated Oct. 13, 1964.

This invention relates to photographic products and more particularly to novel photographic film assemblages including photosensitive materials adapted to be exposed and processed.

Photographic products of the type with which the present invention is concerned generally include a photosensitive element adapted to be exposed, superposed with a second element and then processed by a fluid processing agent, distributed between the superposed elements, preferably to produce a transfer image in an image-receiving layer carried on one of the elements between the outer surfaces thereof. In one particular type of exposue and processing apparatus, distribution of the liquid processing agent is effected, following exposure of the photosensitive element, by moving the element in superposition relative to and between a pair of juxtaposed pressure-applying members. The processing of the photosensitive elements is such as to require the superpositioning of predetermined surfaces of the two elements and it has been the practice heretofore to connect and arrange the two elements, e.g., the photosensitive and image-receiving elements, in such a way that predetermined surfaces of the two elements are superposed merely by drawing the two elements relative to and between the pressure-applying members. The elements, i.e., sheets, have been arranged initially with at least portions of the two surfaces in superposition, or the elements have been connected by leader or carrier sheets coupled and arranged with the appropriate surfaces thereof in superposition. Thus, the relationship between the surfaces of the two elements and the leader or carrier sheets, when superposed, could be considered to be essentially fixed. In the apparatus of the aforesaid patent, one of the photosensitive and second elements is rotated relative to the other through 180° about an axis lying in one element and extending at right angles to the direction of movement thereof between the pressure-applying members. More simply stated, the apparatus includes means for engaging one of the elements and pivoting it through 180°.

An object of the invention is to provide a photographic film assemblage for use in apparatus as described comprising a photosensitive element and a second element arranged for movement into superposition and having a portion so connected as to permit rotation of one of the elements relative to the other of the elements and said portion through 180° about an axis lying substantially in one element and extending at right angles to the direction of movement of the element into superposition.

Other objects of the invention are: to provide a photographic film assemblage comprising a carrier element, a photosensitive element mounted at an edge of said carrier element for rotation substantially about said edge through 180° with respect to said carrier element; to provide a film assemblage as described wherein a fluid processing composition is provided in a rupturable container located for releasing the contents between said elements following rotation of said photosensitive element through 180° with respect to said carrier element into superposition therewith; and to provide a photographic film assemblage as described including a second element connected to said photosensitive element by said carrier element, and wherein one of the said photosensitive and second elements is mounted on said carrier element for rotation through 180° with respect to the other of said photosensitive and second elements and said carrier element.

A further object of the invention is to provide a photographic film assemblage including a plurality of connected film units of the type described, each including a photosensitive element adapted to be exposed and processed in conjunction with a second element, means connecting the elements and mounting one of the elements for rotation through 180° with respect to the other and a rupturable container of processing liquid positioned for releasing its contents between each pair elements following rotation of one of the elements with respect to the other.

Other objects of the invention will in part be obvious and will in part appear hereinafter.

The invention accordingly comprises a product possessing the features, properties and relation of components which are exemplified in the following detailed disclosure, and the scope of the application of which will be indicated in the claims. For a fuller understanding of the nature and objects of the invention, reference should be had the following detailed description taken in connection with the accompanying drawing wherein:

FIG. 1 is a perspective view, partially in section, of a photographic film unit embodying the invention;

FIGS. 2 and 3 are perspective views of components of the film unit of FIG. 1;

FIG. 4 is a sectional view of a photographic film assemblage embodying the invention, the section being taken substantially midway between the sides of the film assemblage;

FIG. 5 is a diagrammatic showing of components of the film assemblage of FIG. 4;

FIGS. 9 and 10 are sectional views of portions of the photographic film assemblage of FIG. 8, illustrating two stages of the processing of said film assemblage.

Figure 6:
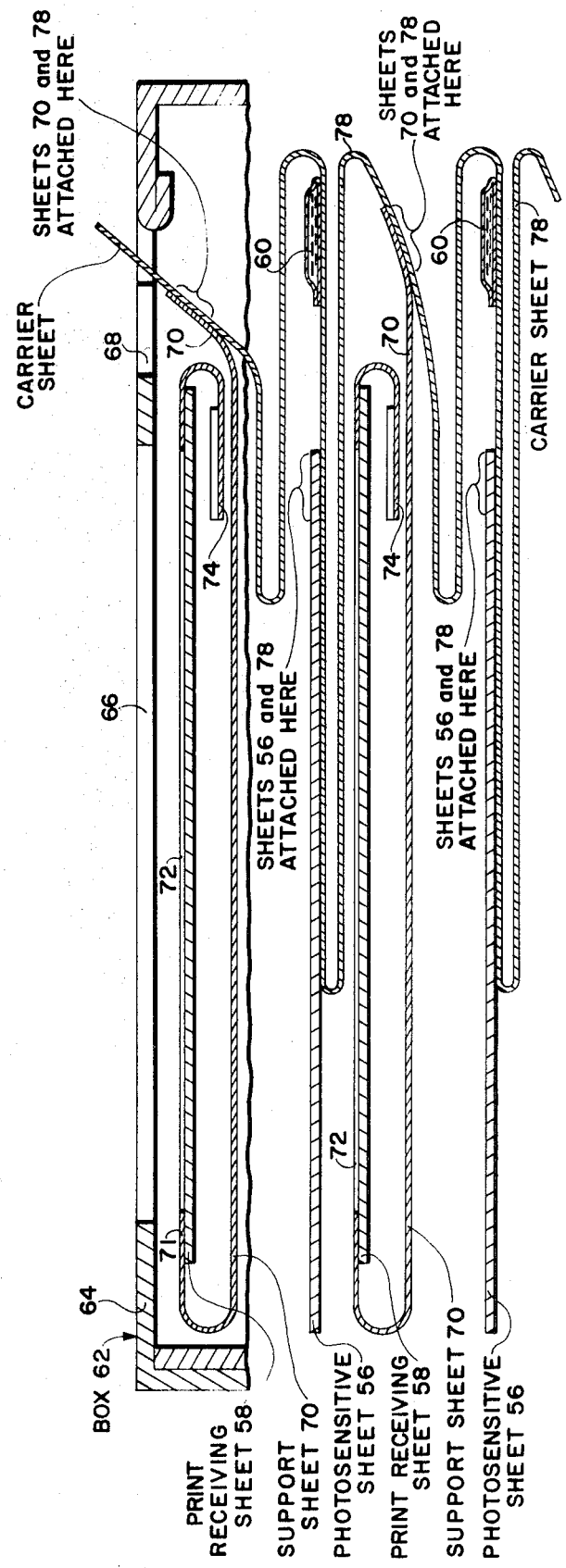
FIG. 6 is an enlarged exploded sectional view of the film assemblage of FIG. 4.

Heretofore, there have been two basic types of film assemblages adapted to be exposed and processed in the camera. One type of film assemblage is similar to the film assemblage shown in U.S. Pat. No. 2,579,587 issued Dec. 25, 1951, to Edwin H. Land and comprises two elongated strips, one including a succession of photosensitive elements or exposure frames adapted to be exposed in the camera and the other strip, including a succession of second or print-receiving elements (or areas) which are superposed with the photosensitive elements following exposure thereof. The two strips are initially provided as separate rolls and are joined to one another at their leading end sections with the appropriate sides of the two strips in facing relation. The processing fluid is carried in a succession of rupturable containers mounted on one of the strips and is spread between the facing surfaces of two strips. Cameras designed for use with this type of film assemblage (see for example U.S. Pat. No. 2,455,111, issued Nov. 30, 1948 in the name of Joseph F. Carbone et al.) include means for positioning the photosensitive strip, or photosensitive elements mounted on a carrier strips, for exposure with the surface of the strip or photosensitive elements against which the fluid is to be spread facing the exposure means (lens) of the camera. It may be desirable (for reasons which will appear hereinafter) while employing this basic form of camera and film assemblage, to expose the surface of each photosensitive element which is opposite the surface of each element against which the processing fluid is spread.

The other basic type of film assemblage takes the form of a film unit or a film pack or magazine comprising a plurality of individual film units. Each film unit includes a photosensitive elements, a second element which is superposed with the photosensitive element following exposure thereof and for processing, and a rupturable container of processing fluid arranged to release its contents between the superposed photosensitive and second elements following exposure of the photosensitive element and superpositioning of the elements. In the film units of the invention, the photosensitive and second elements of each film unit are arranged with first surfaces thereof in superposition and are connected to one another in such a way that one of the elements can be pivoted through 180° with respect to the other element to bring the opposite surface of the pivoted element into facing relation with the first surface of the other element. This makes it possible, for example, to arrange a plurality of film units in stacked relation in a magazine with the photosensitive and second elements in alternating relation and the second element of each film unit arranged outermost so as to prevent exposure of the photosensitive element of each film unit. The second element of each film unit is separated from the photosensitive element to permit the latter to be exposed and, during this separation, the second element is rotated through 180° with respect to the photosensitive element prior to being resuperposed therewith.

In the preferred form of the film assemblage, each photosensitive element comprises a photosensitive silver halide emulsion adapted to be exposed for producing a developable latent image therein. The second element (with which the photosensitive element is superposed during processing) may merely aid in the distribution of the fluid processing composition on the photosensitive element, or it may comprise an image-receptive element or support for a transfer image produced as a result of the development of a latent image in the exposed silver halide emulsion. The fluid processing composition preferably includes a silver halide developer and, when distributed in a thin layer between the photosensitive and image-receptive elements, is adapted to the formation of an image by the transfer of image-forming substances resulting from the development of the latent image in the silver halide. The photosensitive element, second element and fluid processing composition comprise a film unit which is processed preferably to effect the formation of a positive silver transfer print; and further examples of materials useful in such film units are described in U.S. Pats. Nos. 2,543,181, issued Feb. 27, 1951 and 2,662,822, issued Dec. 15, 1953, both in the name of Edwin H. Land.

One form of film unit embodying the invention is shown at 10 in FIGS. 1 through 3 of the drawings and is adapted to be employed individually, or it may comprise one of an assemblage of film units. Film unit 10 includes a photosensitive sheet 12 comprising a silver halide emulsion layer on a suitable support, such as paper, plastic or any of the conventional film base materials. Photosensitive sheet 12 is mounted on an elongated support sheet 14 which is slightly wider and substantially longer than photosensitive sheet 12 and comprises the rear panel of an envelope 15, shown in FIGS. 1 and 2. Envelope 15, including support sheet 14, preferably comprises a material such as black paper, metal foil or the like, which is opaque to light actinic to the photosensitive sheet, whereby the support sheet provides an outer opaque layer for the film unit. A second or print-receiving sheet 16, generally coextensive with the photosensitive sheet, is provided secured to second support sheet 18 (see FIGS. 1 and 3), the latter also being opaque to actinic light and substantially longer (by approximately the length of said second sheet) than support sheet 14.

Envelope 15 comprises a forward panel 20 having a generally rectangular aperture 22 formed therein. Aperture 22 is located toward the trailing end of the envelope and is bounded at the trailing end of the envelope by trailing end section 24 of forward panel 20. The forward panel also includes lateral marginal sections 26 at the sides of aperture 22. Photosensitive sheet 12 is mounted within the envelope on the portion of support sheet 14 nearest the trailing end of the support sheet in alignment with aperture 22, with the photosensitive layer of the photosensitive sheet facing the aperture.

Second support sheet 18 includes a first intermediate section 28, at least equal in length to the second sheet 16, for mounting second sheet 16. The width of section 28 is approximately equal to that of support sheet 14 so that the lateral margins of first intermediate section 28 project beyond the lateral margins of second sheet 16. Second support sheet 18 includes a second intermediate section 30 substantially longer than section 28 and a folded leading end section 32. Second intermediate section 30 and leading end section 32 of the second support sheet are approximately equal in width to support sheet 14.

In the assembled form of the film unit shown in FIG. 1, first intermediate section 28 of second support sheet 18 is folded toward the leading end of the film unit so that it lies against intermediate section 30 with second sheet 16 disposed outermost. Second intermediate section 30 is superposed with photosensitive sheet 12, and the lateral margins of first and second intermediate sections 28 and 30 are engaged within envelope 15 between lateral marginal sections 26 and support sheet 14, the envelope thereby retaining the film unit in its assembled form. The leading end of second sheet 16, that is, the end thereof in the region of the fold in second support sheet 18 and located adjacent the trailing end of the film unit, is retained in the pocket formed by trailing end marginal section 24 and support sheet 14. Envelope 15 is provided with an opening 34 at its leading end and second intermediate section 30 is positioned within the envelope between forward panel 20 and support sheet 14 with leading end section 32 projecting through opening 34 to provide a leader for manipulating the film unit in a manner to be described hereinafter. The envelope and second support sheet 18 cooperate to provide a light-tight enclosure for photosensitive sheet 12, preventing light from entering between first and second intermediate sections 28 and 30 of second support sheet 18 and around the leading end of photosensitive sheet 12.

Film unit 10 includes a quantity of a fluid processing composition provided in a rupturable container 36 secured to support sheet 14 adjacent the leading end of photosensitive sheet 12 between sheet 14 and forward panel 20. Container 36 comprises a rectangular blank of a sheet material, for example a multi-ply material which is impervious to air and the fluid processing composition. The blank is folded longitudinally and its end and longitudinal margins are sealed together to form a cavity for containing the processing fluid. The longitudinal edge seal of the container is weaker than the end seals, is directed toward the photosensitive sheet (and the trailing end of the film unit) and is adapted to become unsealed in response to the application of compressive pressure to the container, for providing a mouth through which the contents of the container are released or discharged substantially unidirectionally.

Processing of the film unit, following exposure of the photosensitive sheet, is effected by superposing second sheet 16 with the photosensitive sheet and moving the two sheets and the container, commencing with the container, between a pair of pressure-applying members for rupturing the container, causing its contents to be discharged between the sheets and for distributing the fluid processing composition in a thin layer therebetween. As a means for controlling the thickness of the layer of processing fluid and for defining the area between the sheets in which processing and formation of a transfer image occur, there is provided a mask sheet 38 secured to print-receiving sheet 16 along the margins and at the ends of the print-receiving sheet, and having a generally rectangular aperture 40 defining the area of the print-receiving sheet in which the positive print is formed. In the embodiment of film 10 shown, print-receiving sheet 16 is secured to mask sheet 38 and the leading end of the mask sheet is secured to second intermediate section 30 of second support sheet 18. Container 36 is preferably so positioned that the longitudinal marginal portion of the container comprising the sides of the discharge mouth extend between the leading ends of the photosensitive sheet and the mask sheet in order to insure discharge of the fluid contents of the container between the photosensitive and print-receiving sheets.

Film unit 10 is intended to be employed in photographic apparatus, particularly a camera. The camera includes a pair of pressure-applying members between which the film unit is withdrawn from the camera to effect its processing. The pressure-applying members may be of any one of different constructions, a pair of juxtaposed rolls biased toward one another being the preferred form. Prior to processing, however, the film unit must be introduced into the camera and, prior to exposure, the print-receiving sheet must be spaced from the photosensitive sheet to permit exposure of the latter. Film unit 10 is particularly adapted to be employed individually, that is, a single film unit 10 is introduced into the camera, is exposed and thereafter withdrawn to effect its processing. A camera for this purpose will include an opening or passage located adjacent the pressure-applying rolls through which the film unit is both introduced into and withdrawn from the camera. Means may be provided on the camera for temporarily spacing the pressure-applying rolls whereby the film unit may be introduced and moved into exposure position without the application of compressive pressure to the container of the film unit. When the film unit is in exposure position, the pressure-applying rolls may then be allowed to come together and will engage the film unit between the container and the leading end of the film unit, the latter projecting from the camera.

To separate the print-receiving sheet and the trailing and intermediate sections thereof from the photosensitive sheet to permit exposure of the latter, the operator grasps the leading end section 32 of second support sheet 18, withdrawing the latter through opening 34 between support sheet 14 and forward panel 20. The camera includes a wedge-shaped device located in contact with forward panel 20 adjacent the inside of the pressure-applying rolls, adapted to engage first intermediate section 28 of second support sheet 18 and guide first intermediate section 28 and print-receiving sheet 16, mounted thereon, into a chamber in the camera as the second support sheet is withdrawn. Movement of the trailing end section of the second sheet and the print-receiving sheet into this chamber, which may be disposed at an acute angle with respect to the plane of the photosensitive sheet, is continued until the fold (shown by a broken line in FIG. 3) between first intermediate section 28 and second intermediate section 30 is engaged by the forward panel 20 at the leading edge of opening 22. To insure proper guidance of first intermediate section 28 by projection of this wedge-shaped member between it and second intermediate section 30, support sheet 18 is provided with a trailing end section 42 folded back upon itself and extending outside of forward panel 20 at the leading edge of aperture 22. This arrangement also insures that this wedge-shaped member will not project between first intermediate section 28 and the second sheet mounted thereon.

To facilitate the above-described manipulation of first intermediate section 28 and second sheet 16 mounted thereon, a slit 44 is provided in each lateral marginal section 26 adjacent the leading edge of aperture 22 and spaced therefrom toward the trailing end of the film unit so as to provide short lateral portions 46 which extend inwardly toward one another between first intermediate section 28 and second intermediate section 30. In this manner light-sealing of the film unit is effected while permitting first intermediate section 28 to extend outside of the envelope. Manipulation of the film unit is further facilitated by the provision of indentations or recesses 48 in the lateral margins of first and second intermediate sections 28 and 30 of second support sheet 18 in the region of the fold in said support sheet.

When movement of second support sheet 18 is arrested by engagement of fold in the support sheet by forward panel 20, photosensitive sheet 12 is left uncovered and may be exposed. Second intermediate section 30 of the second support sheet projects a considerable length beyond the leading end of the envelope and may, if desired, be torn from the remainder of second support sheet 18 remaining within the envelope and attached to the second sheet. For this purpose the second intermediate section of second support sheet 18 is weakened by perforating or precutting. To process the film unit following exposure of the photosensitive sheet, the operator grasps the leading end of the film unit at the leading end of envelope 15 and draws the entire film unit between the pressure-applying members from the camera. Print-receiving sheet 16 is thereby superposed with photosensitive sheet 12 and the container, photosensitive and print-receiving sheets and the trailing end sections of the two support sheets are drawn between the pressure-applying members for discharging the fluid contents of the container between the photosensitive and second sheets and spreading the fluid therebetween.

The layer of processing fluid spread between the photosensitive and print-receiving sheets functions to laminate the two sheets together, preventing exposure of the photosensitive sheet as the film unit is withdrawn from the camera. Lateral marginal sections 26 and end marginal section 24 of envelope 15 also function to prevent light from entering between the margins of the photosensitive and print-receiving sheets. Any excess fluid processing composition that may be squeezed from between the ends of the photosensitive and second sheets is trapped in the pocket formed by end marginal section 24. The photosensitive and second sheets are permitted to remain in superposition with the layer of fluid processing composition therebetween during a predetermined processing period, at the end of which they are stripped apart, the mask preferably adhering to the photosensitive sheet. Thereafter, the print-receiving sheet, which may comprise a positive photographic print, is separated from first intermediate section 28 of second support sheet 18.

In the film unit shown and the apparatus described, separation or spacing apart of the print-receiving sheet from the negative is effected, when the negative is in exposure position, by drawing a leader or support sheet from the apparatus. During the interval between the introduction and the withdrawal of the film unit, the print-receiving sheet is pivoted, in effect, from a position in a plane substantially parallel with the photosensitive sheet, with one surface disposed adjacent the photosensitive sheet, through approximately 180° about a transverse line, to a position with its opposite surface in superposition with the photosensitive sheet.

An assemblage, designated 54, of a plurality of film units, wherein the print-receiving sheets are adapted to be manipulated in a similar manner, is shown in FIGS. 4, 5 and 6 of the drawings. Assemblage 54 comprises a plurality of film units or pairs of photosensitive and print-receiving sheets interconnected with one another and adapted to be exposed and processed in predetermined succession. The film units comprising assemblage 54 are contained in a magazine or housing which holds the assemblages in assembled form, prevents exposure of the photosensitive sheets and permits the film units to be exposed and processed, one at a time and in predetermined succession, simply and expeditiously.

Assemblage 54 comprises a plurality of photosensitive sheets 56, an equal number of second or print-receiving sheets 58 arranged alternately in stacked relation, and containers 60 of fluid processing composition, the photosensitive and print-receiving sheets and processing fluid being composed substantially as described. The assemblage comprises a housing or box 62, generally parallelepiped in shape, and including a forward wall 64 having therein an enlarged rectangular exposure aperture 66 through which photosensitive sheets 56 in the housing may be exposed. Forward wall 64 includes a second aperture 68 adjacent what is termed the leading end of the assemblage and through which the film units comprising the assemblage can be withdrawn from housing 62.

Each print-receiving sheet 58 is mounted on a support sheet 70 having a length which exceeds twice the length of the print-receiving sheet. Support sheet 70 comprises an intermediate section 71 having a rectangular aperture 72 defining the picture area and adapted to function as a mask, the print-receiving sheet being secured to the intermediate section of the support sheet at the margins of aperture 72. Support sheet 70 also includes a relatively short trailing end section 74 extending around the trailing end of the print-receiving sheet and a leading end section 76 which is somewhat longer than the print-receiving sheet and is folded around the leading end of the print receiving sheet so as to extend behind the print-receiving sheet past the trailing end thereof. The print-receiving sheet or at least an outer layer thereof comprises a material opaque to actinic light and, preferably, the support sheet also comprises a material opaque to actinic light.

Film assemblage 54 includes an elongated carrier sheet 78, also comprising a material opaque to actinic light. Support sheets 70 are secured at their leading ends at regularly spaced intervals to carrier sheet 78, the spacing along the carrier sheet between masking sheets being at least twice the length of the print-receiving sheets and preferably longer. Each photosensitive sheet 56 is secured adjacent its leading end to carrier sheet 78 at a position immediately following the print-receiving and support sheet corresponding to said photosensitive sheet between said support sheet and the next successive support sheet. The leading end of the photosensitive sheet is spaced along the carrier sheet from its corresponding support sheet by substantially the length of leading end section 76 of the support sheet, so that, when the support sheet is unfolded and the carrier sheet is extended to its fullest, the photosensitive and print-receiving sheets will register with one another and can be superposed. A container 60 is mounted on carrier sheet 78 adjacent the leading end of each photosensitive sheet. The arrangement of photosensitive and print-receiving sheets, containers and support sheets on carrier sheet 78 is shown in FIG. 6 and illustrated schematically in FIG. 5.

In the assembled form of the film assemblage, the print-receiving sheet of the first film unit is located adjacent forward wall 64 with intermediate section 71 of support sheet 70 disposed closest the forward wall, so that the trailing end of the print-receiving sheet is located closest the leading end of the assemblage adjacent aperture 68. The photosensitive sheet of the first film unit and the container associated therewith are located behind the first print-receiving sheet and a first portion, designated 78a, of carrier sheet 78, extending between the first support sheet and the first photosensitive sheet, comprises a fold located between the leading end 76 of the first support sheet and the first photosensitive sheet. The second print-receiving sheet (of a second film unit) and its support sheet are arranged in the same manner as the first photosensitive sheet and support sheet with a second portion, designated 78b, of carrier sheet 78, extending between the first photosensitive sheet and the second support sheet, comprising a fold located between the first photosensitive sheet and the intermediate section 71 of the second support sheet. Subsequent photosensitive sheets, support sheets, print-receiving sheets and portions of the carrier sheet are similarly arranged in succession.

Assemblage 54 includes a spring 80 and pressure plate 82 located within housing 62 behind the film units for urging them forward against forward wall 64 so that each photosensitive sheet is positioned for exposure against the forward wall across exposure aperture 66. In the assembled form shown, the first print-receiving sheet seals aperture 66 against the admission of light, preventing exposure of the photosensitive sheets.

The film assemblage 54 is intended to be loaded into, and employed in, photographic apparatus such as a camera, shown in FIG. 6 of the drawings. With the assemblage in the camera, to make an exposure the operator pulls on carrier sheet 78, thereby drawing the first print-receiving sheet from housing 62 through aperture 68, thereby leaving the first photosensitive sheet uncovered and in position for exposure. To process the first film unit, following exposure of the photosensitive sheet, the operator again pulls on the carrier sheet, drawing the first container 60 and the first photosensitive sheet (of the first film unit) from housing 62 through aperture 68 into superposition with the first print-receiving sheet, both sheets being guided and manipulated by means in the camera. To assure the withdrawal of the film units, one at a time, from the housing, a lip 84 comprising the leading edge of aperture 68 is provided, so that containers 60, attached to carrier sheet 78, extend to the leading end of the housing where they partially underlie lip 84.

In the film assemblages illustrated heretofore, the second or print-receiving sheet is the sheet which is rotated through approximately 180°, with respect to another sheet, from an initial storage position to a processing position. In another form of film assemblage illustrated in FIG. 7 of the drawings, it is the photosensitive sheet which is rotated through 180° from an initial storage position to a processing position. This film assemblage, designated 159, comprises a container 160 having a slot 162 at one end through which a series of connected film units, each including a photosensitive sheet 164 and a second sheet 166, may be withdrawn. The photosensitive and second sheets are arranged in overlying stacked relation within container 160 with the trailing ends of the photosensitive sheets located at the end of the assemblage in which slot 162 is located and with the trailing ends of the second sheets located at the opposite end of the assemblage from slot 162. The foremost photosensitive sheet, i.e., the first to be exposed, is located with its trailing end adjacent and in alignment with slot 162 and subsequent second and photosensitive sheets are arranged in alternating order behind the foremost photosensitive sheet. The photosensitive sheets are mounted on a series of connected carrier sheets, the foremost photosensitive sheet being mounted on a first carrier sheet, designated 168, which extends behind the photosensitive sheet and is attached to the front surface thereof, i.e., the surface thereof to be exposed, at the leading end of the photosensitive sheet. A second carrier sheet, designated 170, is joined to the first carrier sheet midway between the ends of the photosensitive sheet and includes a first section 170a extending between the first photosensitive sheet and the first print-receiving sheet toward the trailing end of the photosensitive sheet, a second section 170b extending toward the trailing end of the first print-receiving sheet, a third section 170c extending behind the first print-receiving sheet toward the leading end thereof, and a fourth section 170d extending behind the next successive photosensitive sheet toward the leading end thereof where the fourth section is secured to the forward surface of the second photosensitive sheet. The second section of carrier sheet 170 is secured to that surface of the first print-receiving sheet which is superposed with the first photosensitive sheet and is provided with a rectangular aperture defining the area of the print-receiving sheet with which the fluid is spread in contact. A rupturable container 174 of processing fluid is mounted on second section 170b of second carrier sheet 170 adjacent the leading end of print-receiving sheet 166 in position to discharge its contents for spreading between the print-receiving sheet and a photosensitive sheet superposed therewith. The sheet materials, processing fluid, containers, etc., and their composition and construction, comprising film assemblage 159; and the photographic process performed by the film assemblage, may be essentially the same as those described for film unit 10 and/or film assemblage 54. Each photosensitive sheet 154 is also provided with a relatively short trailer sheet 176 at its trailing end adapted to cooperate with the carrier sheet for collecting any excess processing fluid spread from between the trailing ends of the photosensitive sheet and a second sheet superposed therewith during processing of the sheets.

Figure 7:
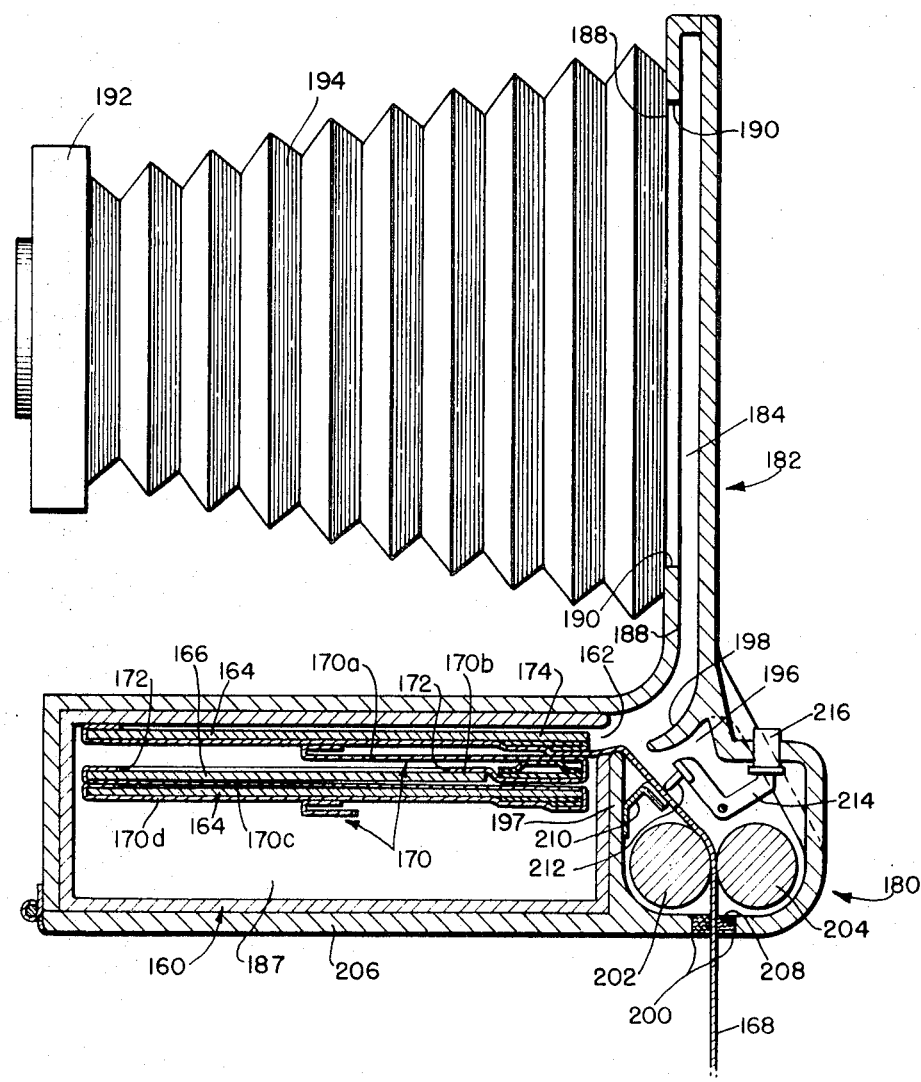
FIG. 7 is a sectional view of another form of a film assemblage embodying the invention, the film assemblage being shown loading into a camera.

A camera, designated 180, for use with film assemblage 159, is also illustrated in FIG. 7 as comprising a housing having a first section 182 defining an exposure chamber 184 for holding a photosensitive sheet in position for exposure and a second section 186 providing a storage chamber disposed generally at right angles to chamber 184 for holding film assemblage 159. First housing section 182 includes a forward wall 188 having an exposure aperture 190 for admitting light to chamber 184 for exposing a photosensitive sheet positioned within the chamber across the exposure aperture. The camera includes means in the form of a conventional lens and shutter assembly 192 coupled with first housing section 182 by a bellows 194.

The camera housing includes means providing a processing chamber 196 connecting exposure chamber 184 and the storage chamber, the storage chamber being separated from the third chamber by a wall 197 providing an opening into the third chamber adjacent one end of the exposure chamber. A guide member 198 is provided in third chamber 196 extending toward the opening in the second chamber 187 for guiding photosensitive sheets from the storage chamber into the first chamber and film assemblage 159 is positioned within the storage chamber with slot 162 in container 160 aligned with the opening in the storage chamber so that, as a photosensitive sheet is withdrawn from the container of the film assemblage trailing end first, the trailing end of the photosensitive sheet extends into engagement with guide member 198. Third chamber 196 is provided with a withdrawal passage 200 in the side thereof opposite first chamber 184 and a pair of juxtaposed pressure-applying rolls 202 and 204 are are mounted in third chamber 196 adjacent withdrawal passage 200 for applying compressive pressure to the photosensitive and second elements of each film unit of assemblage 159 as the elements are withdrawn through the third chamber between the pressure-applying rolls. Light sealing means 208 are provided in passage 200.

Second housing section 186 includes a rear door 206. Pressure-applying roll 202 is mounted, together with dividing wall 208, so that roll 202 may be spaced apart from roll 204 to permit loading of the camera with a portion of first carrier sheet 168, extending from container 160, threaded through the processing chamber and positioned between the pressure-applying rolls so as to extend through passage 200. To make an exposure, the operator pulls on the portion of carrier sheet 168 which projects from passage 200, drawing the first photosensitive sheet through slot 162 into engagement with guide member 198 which guides the latter into exposure chamber 184 where the photosensitive sheet is held in position for exposure. To process the exposed photosensitive sheet, the operator again pulls on carrier sheet 168, drawing the photosensitive sheet from chamber 184 around the end of guide member 198 into third chamber 196 into superposition with a print-deceiving sheet, drawn at the same time from from container 160, to form a sandwich which is drawn between the pressure-applying rolls from the camera.

An indexing device comprising a support member 210 mounted within third chamber 196 for supporting a portion of carrier sheet 168 against an engagement member in the form of a pin 212 is provided in the camera for arresting the movement of the sheet materials when a photosensitive sheet is positioned for exposure within chamber 184. The carrier sheet is formed with at least one opening in a margin thereof, into which pin 212 projects for arresting the movement of the carrier sheet when a photosensitive sheet is in position for exposure. Pin 212 is mounted on one end of a generally V-shaped lever 214, pivotally mounted within chamber 196 and having a pushbutton 216 projecting from the housing to provide means for pivoting lever 214. The lever is spring-biased so as to urge pin 212 against carrier sheet 168 positioned on support member 210. To process a photosensitive sheet following exposure thereof, button 216 is depressed inwardly to disengage pin 212 from an opening in carrier sheet 168.

Figure 8:
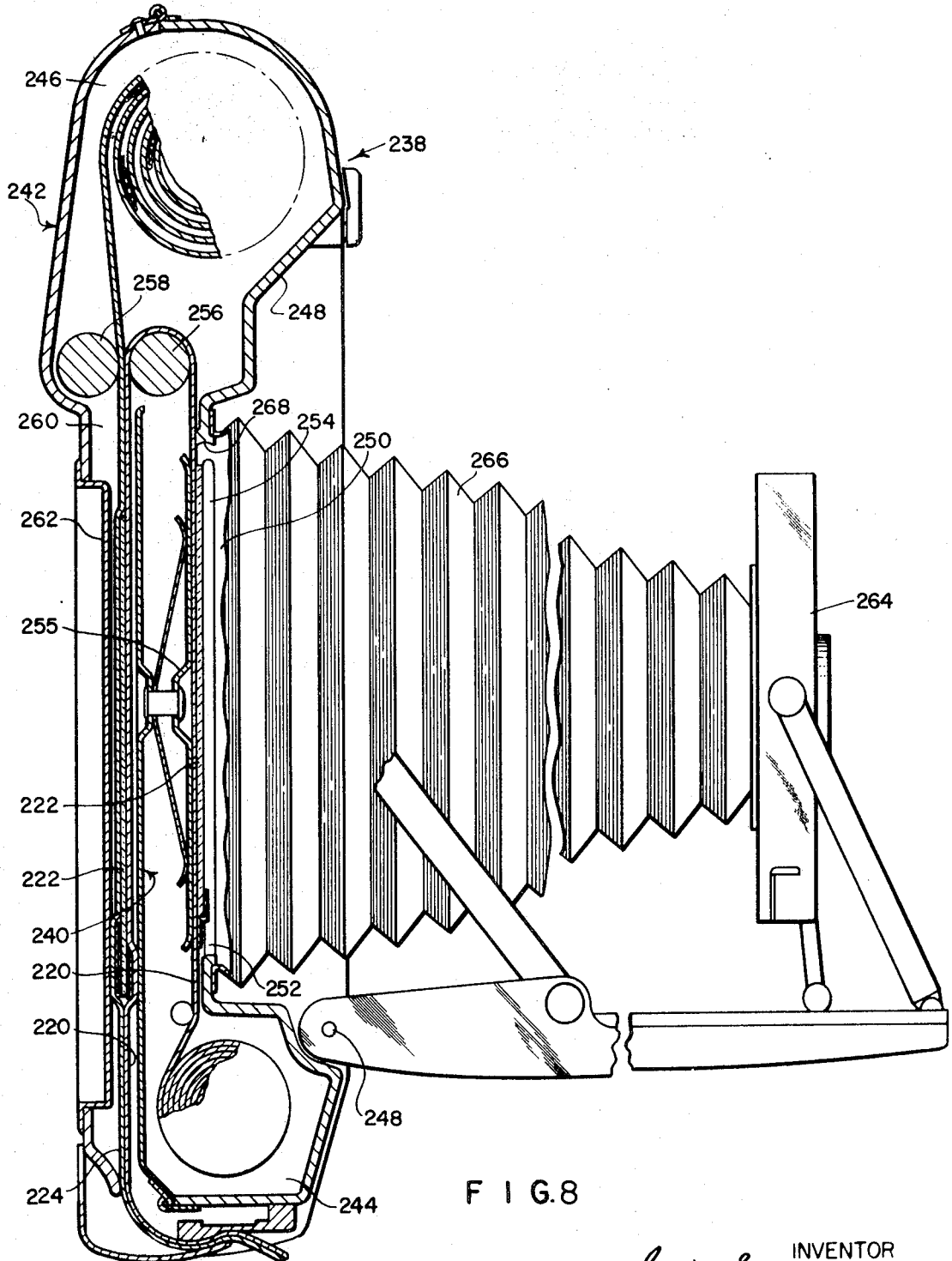
FIG. 8 is a sectional view, similar to FIG. 7, of another embodiment of a film assemblage incorporating the invention and shown in a camera.

As noted above, another basic type of film assemblage takes the form of two rolls or coils. Reference is now made to FIGS. 8 through 10 of the drawings wherein a film assemblage of this type is illustrated together with a camera for employing the film assemblage. The film assemblage comprises a first carrier sheet 220 mounting a sequence of film elements 222 and a second carrier sheet 224 mounting a sequence of rupturable fluid-carrying containers 226. Each film element is of the type adapted to be exposed through one surface and then processed by a fluid distributed against the opposite surface. A film assemblage of this type is shown, for example, in U.S. Pat. No. 2,944,894, issued July 12, 1960 to Edwin H. Land, and comprises a photographic screen 228, an image-receiving layer 230, a stripping layer 232 and a photosensitive layer 234, the three layers being carried on the screen in the order stated. The screen may comprise colored filter elements or a lenticular screen, through which light is directed for exposing the photosensitive layer and viewing a transfer image carried by the image-receiving layer. The three layers comprise a unitary element during exposure and processing so that precise registration is maintained between the screen, latent image and transfer image.

Each film element 222 is mounted on first carrier sheet 220 with the photosensitive layer of the film element facing the carrier sheet to allow exposure of the photosensitive layer to be made through the screen and the image-receiving and stripping layers. The film element is secured at a transverse edge to the carrier sheet by a hinge 236 which permits the film element to be pivoted about the edge through 180° with respect to the carrier sheet to bring the screen into facing relation with the carrier sheet and allow the photosensitive layer of the film element to be superposed with the second carrier sheet. Following exposure of the photosensitive element, it is moved from exposure position and it is during this movement from exposure position that the element is pivoted through 180° with respect to the carrier sheet and the photosensitive layer is superposed in face-to-face contact with the second carrier sheet with a rupturable container 226 located between the second carrier sheet and an end edge of the film element and the two carrier sheets. The film element and rupturable container are moved between a pair of pressure-applying members for distributing the processing fluid from the container in a layer 235 between the photosensitive layer and the second carrier sheet to form a sandwich (see FIG. 9) and effect the formation of a transfer image in the image-receiving layer of the film element. Stripping layer 232 of the film element comprises a material soluble in the processing fluid and is weakened by the processing fluid so that, following processing the photosensitive layer can be stripped, together with the second carrier sheet and container, from the film element including the screen and image-receiving layer carrying the transfer image.

The camera for use with this film assemblage is basically the same as the camera illustrated in the aforementioned U.S. Pat. No. 2,455,111 and sold by Polaroid Corporation. The camera comprises a forward housing section 238, an intermediate housing section 240 and a rear housing section 243 providing a first storage chamber 244 for the photosensitive materials, in this case a roll of first carrier sheet 220 carrying film elements 222 and a second storage chamber 246 for holding a roll of second carrier sheet 244. The forward housing section includes a forward wall 248 cooperating with intermediate housing section 240 to provide an exposure chamber 250 through which first carrier sheet 220 is guided. Forward wall 248 is provided with an exposure aperture 252 and guide tracks 254 projecting into the exposure aperture from the sides thereof for engaging the margins of film elements 222 and positioning each element for exposure. A spring and pressure plate assembly 255 mounted on intermediate section 240 supports film elements 222 against guide tracks 254 in position for exposure.

The camera includes a pair of pressure-applying rolls 256 and 258 mounted within second storage chamber 246 adjacent an opening therein leading to a processing chamber 260 located between intermediate and rear housing sections 240 and 242. Each film element carried on carrier sheet 220 is drawn, following exposure, from exposure chamber 250 around pressure-applying roll 258 into superposition with second carrier sheet 224 between rolls 256 and 258 into processing chamber 260, wherein the sandwich comprising the two carrier sheets, film element and layer of processing fluid is allowed to remain during processing. Rear housing section 242 is provided with a door 262 which may be opened to permit removal of the processed film element from the camera. To facilitate removal of the film element, second carrier sheet 224 is provided with a scored or precut section which is aligned with each photosensitive element during processing and can be torn readily from the remainder of the second carrier sheet. The structure of the second carrier sheet, in this respect, resembles the structure of the print-receiving sheet shown in the aforementioned U.S. Pat. No. 2,579,587. The camera also includes a lens and shutter assembly 264 connected to forward wall 248 by a folding bellows 266.

Following exposure of a film element and prior to superposition of the film element with the second carrier sheet, the film element is rotated through 180° with respect to the first carrier sheet about the transverse edge of the film element at which the latter is hinged to the carrier sheet. This pivotal movement of the film element occurs during movement of the film element from exposure position into superposition with the second carrier sheet and is effected within the processing chamber defined by bellows 266 and forward wall 248. Forward wall 248 is provided with a guide section 268 positioned in the path of movement of the film element across the focal plane of the camera for engaging the free edge of each film element as it is moved from exposure position toward pressure-applying roll 258 and guiding the film element forwardly within bellows 266 toward the lens and shutter assembly of the camera. The free end of film element 222 is drawn against guide section 269 as the first carrier sheet is drawn past the guide section and continued movement of the first carrier sheet causes the film element to be drawn past the guide section around pressure-applying roll 258 as hinge 236 comes into alignment with the guide section.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A composite photographic product comprising, in combination:
   an elongated carrier sheet having a leading end;
   a plurality of image-receptive elements each including a photographic screen and at least a layer on one side of said screen including a photosensitive material for supporting an image visible through said screen;
   means mounting each of said image-receptive elements on said carrier sheet for pivotal movement relative thereto about an axis adjacent one end of said image-receptive elements and extending transversely of said carrier sheet, said image-receptive elements being spaced from one another along said carrier sheet by at least the length of said elements;
   each of said elements being disposed in an initial position with said one side thereof superposed with and facing said carrier sheet with the other end of said each element free to swing about said axis and extending toward said leading end of said carrier sheet, and being pivotal about said axis from said initial position to a second position in which said one side of said element including said layer faces away from said carrier sheet;
   a second sheet arranged to be superposed with said carrier sheet and said elements mounted thereon; and
   a plurality of rupturable containers mounted in spaced relation on said second sheet and each containing a quantity of processing liquid sufficient to produce a visible image in said layer of one of said elements when distributed in contact with said layer between the latter and said second sheet;
   said second sheet being coupled with said carrier sheet near the leading end of said carrier sheet with each of said rupturable containers disposed for location adjacent said one end of one of said elements when the latter is in said position and said second sheet is superposed with said carrier sheet and said one element mounted thereon.

2. A composite photographic film assemblage comprising, in combination:

an elongated carrier sheet having leading and trailing ends;

a second sheet having a length less than half the length of said carrier sheet; and means mounting said second sheet on said carrier sheet for pivotal movement relative thereto about an axis adjacent one end of said second sheet and extending transversely of said carrier sheet intermediate said ends of said carrier sheet;

the other end of said second sheet being free to swing about said axis with respect to said carrier sheet;

said sheets being arranged in an initial position in which said second sheet is superposed with said carrier sheet and extends from said axis toward said leading end of said carrier sheet and is pivotable about said axis to a second position in which said second sheet is superposed with said carrier sheet and extends from said axis toward said trailing end of said carrier sheet;

said carrier sheet in either of said positions extending beyond the ends of said second sheet;

said carrier and second sheets each including an element on one side for containing an image, said image-containing elements being symmetrically positioned about said axis whereby said elements are superposed and face one another in said second position of said sheets;

said sheets, in said initial position thereof, being arranged with said one side thereof facing in the same direction and said image-contaning element of said carrier sheet facing said second sheet;

one of said elements being photosensitive and the other of said elements being receptive to a transfer image formed by treatment of said one element in conjunction with said other element.

3. A photographic film assemblage as defined in claim 2 including a rupturable container of liquid for treating said one element to produce a transfer image in said other element when distributed between and in contact with said superposed elements, said rupturable container being mounted on one of said sheets at a location between said sheets near said one end of said second sheet when the latter is in said second position.

4. A photographic film assemblage as defined in claim 2 including a container enclosing said sheets and including an opening adjacent one end through which said sheets can be withdrawn from said container, said sheets being initially positioned within said container with said elements in overlying relation, said leading end of said carrier sheet extending from said container through said opening and said other end of said second sheet being located adjacent said opening for movement therethrough in response to withdrawal of said carrier sheet.

5. A photographic film assemblage as defined in claim 2 including a plurality of said second sheets mounted on said carrier sheet for pivotal movement about axes spaced from one another along said carrier sheet by at least the length of said second sheets; and a corresponding number of said elements for containing images associated with said carrier sheet, each located for superposition with said element associated with one of said second sheets in said second position thereof.

6. A photographic film assemblage as defined in claim 5 including a container enclosing said sheets and having an opening adjacent one end through which said sheets can be withdrawn from said container, said second sheets being arranged in stacked relation within said container with said other ends of said second sheets located adjacent said opening, said carrier sheet being zig-zag folded with said leading end thereof extending from said container through said opening and said elements of said sheets arranged in alternating overlying relation.

7. A photographic film assemblage as defined in claim 6 wherein said means mounting said second sheets on said carrier sheet include connecting sheets each having a first section secured to said carrier sheet and a second section attached to said second sheet at said one end thereof.

8. A photographic film assemblage as defined in claim 6 wherein said elements associated with said carrier sheet each constitutes a separate sheet attached at its leading end to said carrier sheet.

9. A photographic film assemblage as defined in claim 2 wherein said means mounting said second sheet on said carrier sheet include a connecting sheet having a first section secured to said carrier sheet and a second section secured to said second sheet at said one end of said second sheet.

10. A photographic film assemblage as defined in claim 9 wherein said connecting sheet includes a third section intermediate said first and second sections and at least equal in length to said second sheet, said second section of said connecting sheet is secured to the side of said connecting sheet including said area thereof and said third section of said connecting sheet is located between said carrier and second sheets when said second sheet is in said first position.

11. A photographic film assemblage as defined in claim 10 wherein said second section of said connecting sheet is at least equal in length to said second sheet and includes a medial opening substantially coextensive with said area of said second sheet.

References Cited
UNITED STATES PATENTS

| | | | |
|---|---|---|---|
| 3,222,170 | 12/1965 | Elovanta | 96—76 |
| 2,616,805 | 11/1952 | Land | 95—8 |

NORMAN G. TORCHIN, Primary Examiner

J. E. CALLAGHAN, Assistant Examiner

U.S. Cl. X.R.

96—29; 95—19

UNITED STATES PATENT OFFICE
CERTIFICATE OF CORRECTION

Patent No. 3,582,335          Dated June 1, 1971

Inventor(s) Irving Erlichman

It is certified that error appears in the above-identified patent and that said Letters Patent are hereby corrected as shown below:

Column 10, line 34 (Specification page 27, line 21)
change "print-deceiving" to --print-receiving--

Column 12, line 73 (Claim 1, line 37 in application)
after "said (first occurance) insert --second--

Column 13, line 32 (Claim 2, line 32 in application)
change "contaning" to --containing--

Signed and sealed this 23rd day of January 1973.

(SEAL)
Attest:

EDWARD M. FLETCHER, JR.          ROBERT GOTTSCHALK
Attesting Officer                Commissioner of Patents